United States Patent
Nemoto et al.

(10) Patent No.: US 7,581,720 B2
(45) Date of Patent: Sep. 1, 2009

(54) VIBRATION ISOLATION SYSTEM AND METHOD FOR ENGINE, AND CONTROL SYSTEM AND METHOD FOR ACTIVE VIBRATION ISOLATION SUPPORT SYSTEM

(75) Inventors: Hirotomi Nemoto, Saitama (JP); Tetsuya Ishiguro, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 371 days.

(21) Appl. No.: 11/483,962

(22) Filed: Jul. 10, 2006

(65) Prior Publication Data

US 2007/0013116 A1  Jan. 18, 2007

(30) Foreign Application Priority Data

Jul. 11, 2005  (JP)  ............................. 2005-201874
Jul. 12, 2005  (JP)  ............................. 2005-203072

(51) Int. Cl.
*F16F 5/00* (2006.01)
*F16F 13/26* (2006.01)

(52) U.S. Cl. .............................. 267/140.14; 267/140.15

(58) Field of Classification Search ............ 267/140.14, 267/140.15; 123/192.1, 198 F, 481; 701/111
See application file for complete search history.

(56) References Cited

U.S. PATENT DOCUMENTS

| 2005/0003926 A1* | 1/2005 | Hanada et al. | 123/399 |
| 2007/0029712 A1* | 2/2007 | Nemoto | 267/140.4 |

FOREIGN PATENT DOCUMENTS

| JP | 2003-113892 | 4/2003 |
| JP | 2005-3051 | 1/2005 |
| JP | 2005003051 A * | 1/2005 |

* cited by examiner

*Primary Examiner*—Thomas J Williams
(74) *Attorney, Agent, or Firm*—Carrier, Blackman & Associates, P.C.; William D. Blackman; Joseph P. Carrier

(57) ABSTRACT

When switching between L3 cylinder cut-off running in which a bank on one side of a V6 engine is cut off and V4 cylinder cut-off running in which one cylinder in each of the two banks is cut off, V6 all-cylinder running to operate all the cylinders is interposed therebetween. Therefore, a transitional period is provided between L3 cylinder cut-off running and V6 all-cylinder running and between V6 all-cylinder running and V4 cylinder cut-off running, and no transitional period is present between L3 cylinder cut-off running and V4 cylinder cut-off running. Thus, it is possible to simplify control of an active vibration isolation support system during the transitional period and to avoid deterioration of a vibrational state during the transitional period.

8 Claims, 12 Drawing Sheets

FIG.1
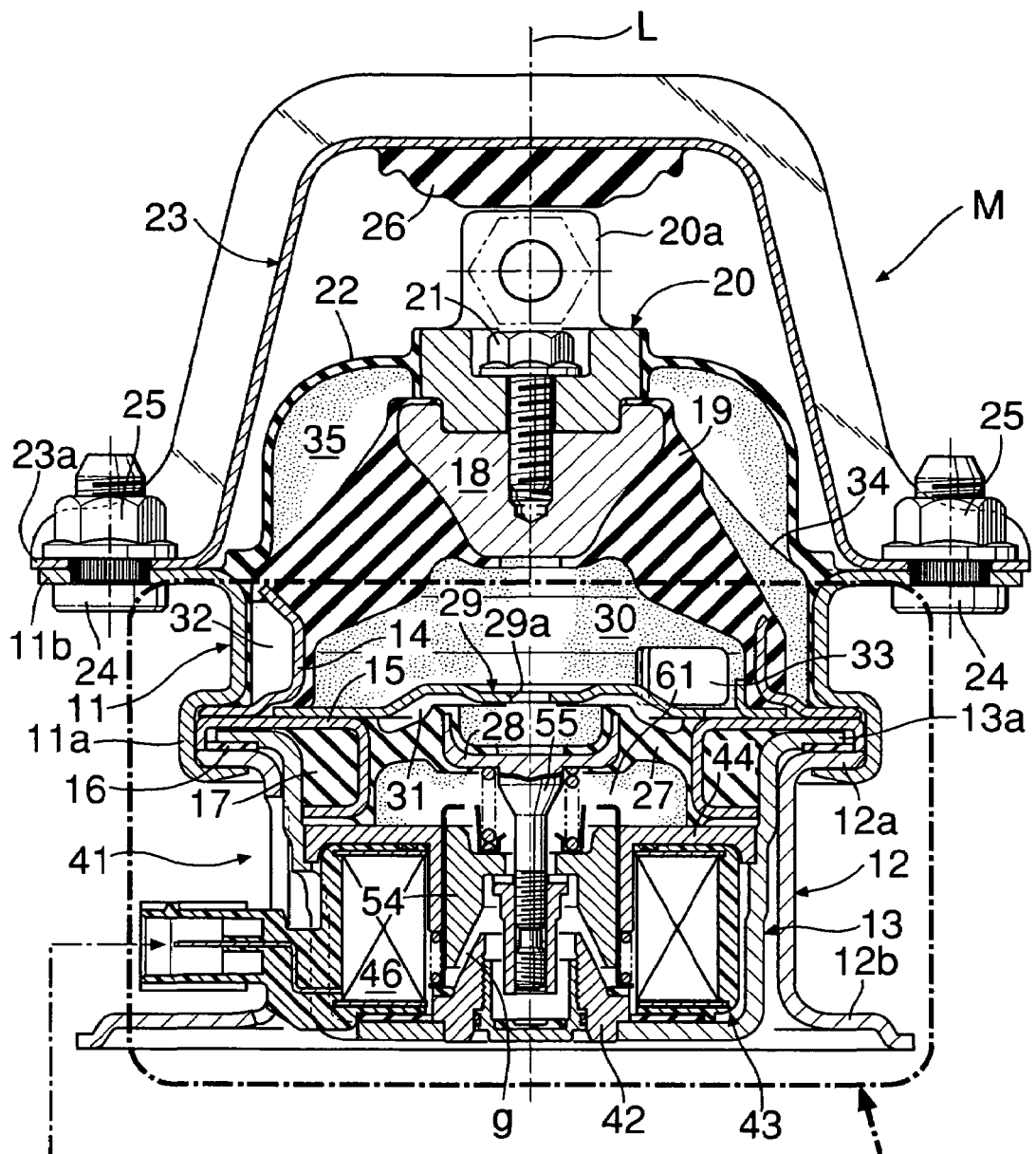
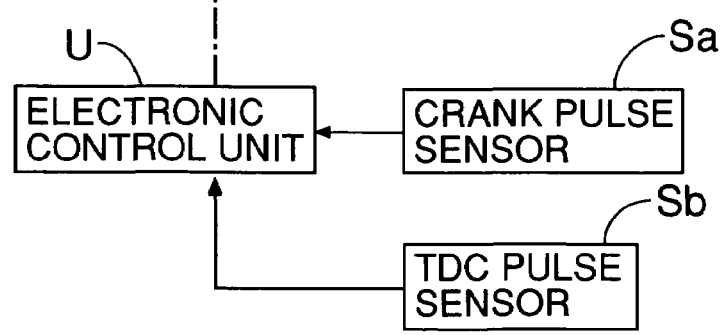

VIBRATION ISOLATION SYSTEM AND METHOD FOR ENGINE, AND CONTROL SYSTEM AND METHOD FOR ACTIVE VIBRATION ISOLATION SUPPORT SYSTEM

RELATED APPLICATION DATA

The Japanese priority application Nos. 2005-201874 and 2005-203072 upon which the present application is based are hereby incorporated in their entirety herein by reference.

BACKGROUND OF INVENTION

1. Field of the Invention

The present invention relates to an engine vibration isolation system and an engine vibration isolation method for suppressing transmission of vibration to a vehicle body from an engine that can switch between a first running and a second running which differ in the number of cylinders that are cut off, by supporting the engine on the vehicle body via an active vibration isolation support system and controlling via a control portion an actuator of the active vibration isolation support system according to a vibrational state of the engine.

The present invention also relates to a control system and a control method for an active vibration isolation support system for suppressing transmission of vibration to a vehicle body from an engine that carries out cylinder cut-off running which combines one cylinder cut-off period and two combustion periods in one cycle, by supporting the engine on the vehicle body via the active vibration isolation support system, and controlling via a control portion an actuator of the active vibration isolation support system according to a vibrational state of the engine.

2. Description of Related Art

Japanese Patent Application Laid-open No. 2005-3051 discloses a device which suppresses vibration during a transitional period between all-cylinder running and cylinder cut-off running by appropriately setting a timing to switch control of an active vibration isolation support system during the transitional period, in a V6 engine in which a bank on one side can be cut off and which can switch between all-cylinder running where all six cylinders are in operation, and cylinder cut-off running where only three cylinders are in operation.

In some V6 engines, in addition to the normal all-cylinder running (V6 all-cylinder running), the operation can be switched between a cylinder cut-off running (L3 cylinder cut-off running) in which the engine runs as an in-line three cylinder engine with a bank on one side cut off, and a cylinder cut-off running (V4 cylinder cut-off running) in which the engine runs as a V4 engine with one cylinder in each of the two banks cut off.

During the transitional period for switching between V6 all-cylinder running and L3 cylinder cut-off running, since the ratio of the frequency of $3^{rd}$ order vibration in V6 all-cylinder running and the frequency of $1.5^{th}$ order vibration in L3 cylinder cut-off running is the integer 2, the vibration waveform of the transitional period is relatively simple, and control of the active vibration isolation support system does not become complicated. However, during the transitional period for switching between V4 cylinder cut-off running and L3 cylinder cut-off running, since the waveform of vibration of the engine becomes complicated as described later, there is a problem that it becomes difficult for the active vibration isolation support system to efficiently exhibit a vibration isolation effect.

Furthermore, Japanese Patent Application Laid-open No. 2003-113892 discloses a device in which, when a vibrational state of an engine is estimated from an angular acceleration of a crankshaft of the engine and operation of an actuator of an active vibration isolation support system is controlled based on the vibrational state, if the engine vibration is large and it is easy to estimate the phase (during cylinder cut-off running), then the operation of the actuator is controlled based on the estimated phase for the engine vibration, whereas if the engine vibration is small and it is difficult to estimate the phase (during all-cylinder running), then the operation of the actuator is controlled based on a preset phase for the engine vibration.

In some V6 engines, the operation can be switched between cylinder cut-off running in which the engine runs as an in-line three cylinder engine with a bank on one side cut off, and cylinder cut-off running in which the engine runs as a V4 engine with one cylinder in each of the two banks cut off.

However, when the V6 engine runs as a V4 engine with one cylinder in each of the two banks cut-off, the cylinder combustion interval is different from that of a proper V4 engine, and thus the vibrational state is also different. That is, in a proper V4 engine, the four cylinders are combusted at equal intervals; whereas in the virtual V4 engine in which cylinders of the V6 engine are cut off, the combustion intervals of the four cylinders that are not cut off are not equal to each other, and the estimated vibrational state for the engine may vary according to the way in which one cycle of vibration is determined, as described later in embodiments.

SUMMARY OF THE INVENTION

The present invention has been accomplished under the above circumstances, and it is a first object thereof to avoid degradation of the vibrational state in a transitional period between a first running and a second running which differ in the number of cylinders that are cut off.

It is a second object of the present invention to accurately estimate a vibrational state of an engine carrying out cylinder cut-off running that combines one cylinder cut-off period and two combustion periods in one cycle.

In order to achieve the above first object, according to a first feature of the present invention, there is provided an engine vibration isolation system comprising: an active vibration isolation support system for supporting, on a vehicle body, an engine that can switch between a first running and a second running which differ in the number of cylinders that are cut off; and a control portion for controlling an actuator of the active vibration isolation support system according to a vibrational state of the engine so as to suppress transmission of vibration from the engine to the vehicle body, wherein the control portion interposes all-cylinder running, in which all the cylinders are operated, in a transitional period between the first running and the second running.

With the above arrangement, the all-cylinder running to operate all the cylinders is interposed in a transitional period between the first running and the second running which differ in the number of cylinders that are cut off. Therefore, the transitional period is provided between the first running and the all-cylinder running and between the all-cylinder running and the second running, and no transitional period is present between the first running and the second running. Thus, it is possible to simplify control of the active vibration isolation support system during the transitional period and to avoid deterioration of the vibrational state during the transitional period.

An electronic control unit U of embodiments corresponds to the control portion of the present invention.

According to a second feature of the present invention, in addition to the first feature, when the ratio of the order of vibration of the first running and the order of vibration of the second running is not an integer, the control portion interposes the all-cylinder running.

With the above arrangement, the all-cylinder running is interposed when the ratio of the order of vibration of the first running and the order of vibration of the second running is not an integer, thereby avoiding interposition of a meaningless all-cylinder running when there is no need of interposition of all-cylinder running.

According to a third feature of the present invention, in addition to the first or second feature, a period of the all-cylinder running is constant regardless of magnitude of load of the engine.

With the above arrangement, the period of all-cylinder running is constant regardless of the magnitude of load of the engine, thereby simplifying the control of engine vibration isolation system in the transitional period.

According to a fourth feature of the present invention, in addition to the third feature, a period of the all-cylinder running is one cycle.

With the above arrangement, the period of the all-cylinder running is one cycle, thereby simplifying the control of engine vibration isolation system in the transitional period.

According to a fifth feature of the present invention, there is provided an engine vibration isolation method comprising the steps of: supporting, on a vehicle body via an active vibration isolation support system, an engine that can switch between a first running and a second running which differ in the number of cylinders that are cut off; and controlling, via a control portion, an actuator of the active vibration isolation support system according to a vibrational state of the engine so as to suppress transmission of vibration from the engine to the vehicle body, wherein the method further comprises the steps of: carrying out the first running in a first period; carrying out, in a transitional period subsequent to the first period, all-cylinder running in which all the cylinders are in operation; and carrying out the second running in a second period subsequent to the transitional period.

With the above arrangement, the transitional period in which all the cylinders are in operation is interposed between the first period in which the first running is performed and the second running in which the second running is performed, the first running and the second running differing in the number of cylinders that are cut off. Therefore, the transitional period is provided between the first running and the all-cylinder running and between the all-cylinder running and the second running, and no transitional period is present between the first running and the second running. Thus, it is possible to simplify control of the active vibration isolation support system during the transitional period and to avoid deterioration of the vibrational state during the transitional period.

In order to achieve the above second object, according to a sixth feature of the present invention, there is provided a control system for an active vibration isolation support system which supports, on a vehicle body, an engine that carries out cylinder cut-off running which combines one cylinder cut-off period and two combustion periods in one cycle, the control system comprising a control portion for controlling an actuator of the active vibration isolation support system according to a vibrational state of the engine so as to suppress transmission of vibration from the engine to the vehicle body, wherein the control portion sets start time of one cycle of reading in the engine vibrational state during the cylinder cut-off running so as to coincide with start time of the cylinder cut-off period.

With the above arrangement, when reading in the engine vibrational state in one cycle in the engine that carries out the cylinder cut-off running which combines one cylinder cut-off period and two combustion periods in one cycle, the start time of such a reading-in cycle is set so as to coincide with the start time of the cylinder cut-off period. Therefore, it is possible to reliably obtain a peak value and a bottom value in the vibrational state of the one cycle to accurately estimate the engine vibrational state, thereby improving the vibration isolation performance of the active vibration isolation support system.

According to a seventh feature of the present invention, there is provided a control method for an active vibration isolation support system, comprising the steps of: supporting, on a vehicle body via the active vibration isolation support system, an engine that carries out cylinder cut-off running which combines one cylinder cut-off period and two combustion periods in one cycle; and controlling, via a control portion, an actuator of the active vibration isolation support system according to a vibrational state of the engine so as to suppress transmission of vibration from the engine to the vehicle body, wherein the one cylinder cut-off period starts at the same time as when starting one cycle of reading in the engine vibrational state during the cylinder cut-off running, and the two combustion periods follow.

With the above arrangement, the one cylinder cut-off period starts at the same time as when starting one cycle of reading in the engine vibrational state, and the two combustion periods follow, in the engine that carries the out cylinder cut-off running which combines one cylinder cut-off period and two combustion periods in one cycle. Therefore, it is possible to reliably obtain a peak value and a bottom value in the vibrational state of the one cycle to accurately estimate the engine vibrational state, thereby improving the vibration isolation performance of the active vibration isolation support system.

According to an eighth feature of the present invention, there is provided a control system for an active vibration isolation support system which supports, on a vehicle body, an engine that carries out cylinder cut-off running which combines one cylinder cut-off period and two combustion periods in one cycle, the control system comprising a control portion for controlling an actuator of the active vibration isolation support system according to a vibrational state of the engine so as to suppress transmission of vibration from the engine to the vehicle body, wherein the control portion calculates the engine vibrational state by filter calculation of a crank angular velocity based on rotational variation of a crankshaft using a differential filter, and sets start time of one cycle of reading in the engine vibrational state during the cylinder cut-off running so as to coincide with start time of the combustion period following the cylinder cut-off period.

With the above arrangement, the start time of one cycle of reading in the engine vibrational state during the cylinder cut-off running is set so as to coincide with the start time of the combustion period following the cylinder cut-off period. Therefore, it is possible to reliably obtain a peak value and a bottom value in the vibrational state of the one cycle to accurately estimate the engine vibrational state, thereby improving the vibration isolation performance of the active vibration isolation support system. Further, the engine vibrational state is calculated by filter calculation of a crank angular velocity based on rotational variation of a crankshaft using a differential filter, thereby eliminating the influence of noise. Although the engine vibrational waveform is displace forward by filter calculation using a differential filter, the start time of one cycle of reading in the engine vibrational state during the cylinder cut-off running is set so as to coincide with the start time of the combustion period following the cylinder cut-off period, providing no problem.

According to a ninth feature of the present invention, there is provided a control method for an active vibration isolation support system, comprising the steps of: supporting, on a vehicle body via the active vibration isolation support system, an engine that carries out cylinder cut-off running which combines one cylinder cut-off period and two combustion periods in one cycle; and controlling, via a control portion, an actuator of the active vibration isolation support system according to a vibrational state of the engine so as to suppress transmission of vibration from the engine to the vehicle body, wherein the engine vibrational state is calculated by filter calculation of a crank angular velocity based on rotational variation of a crankshaft using a differential filter, a series of the two combustion periods is started at the same time as when starting one cycle of reading in the engine vibrational state during the cylinder cut-off running, and the one cylinder cut-off period follows.

With the above arrangement, the series of the two combustion periods is started at the same time as when starting one cycle of reading in the engine vibrational state, and the one cylinder cut-off period follows, in the engine that carries out the cylinder cut-off running which combines one cylinder cut-off period and two combustion periods in one cycle. Therefore, it is possible to reliably obtain a peak value and a bottom value in the vibrational state of the one cycle to accurately estimate the engine vibrational state, thereby improving the vibration isolation performance of the active vibration isolation support system.

The above-mentioned objects, other objects, characteristics, and advantages of the present invention will become apparent from preferred embodiments that will be described in detail below by reference to the attached drawings.

BRIEF DESCRIPTION OF DRAWINGS

FIG. 1 to FIG. 9 show a first embodiment of the present invention;

FIG. 1 is a vertical sectional view of an active vibration isolation support system, FIG. 2 is an enlarged view of part 2 in FIG. 1, FIG. 3 is a diagram showing cylinder number and combustion order of a V6 engine, FIG. 4 is a diagram showing a read-in period, a calculation period, and a control period during V6 all-cylinder running, FIG. 5 is a flowchart for explaining a technique of controlling the active vibration isolation support system, FIG. 6 is a diagram showing a vibrational state when switching over from L3 cylinder cut-off running to V6 all-cylinder running, FIG. 7 is a diagram showing a vibrational state when switching over from V6 all-cylinder running to L3 cylinder cut-off running, FIG. 8 is a diagram showing a vibrational state when switching over from L3 cylinder cut-off running to V4 cylinder cut-off running, and FIG. 9 is a diagram showing a vibrational state when switching over from L3 cylinder cut-off running to V4 cylinder cut-off running with V6 all-cylinder running interposed therebetween.

FIG. 10 is a time chart for explaining the operation of V4 cylinder cut-off running, FIG. 11 is a time chart for explaining the operation during a transition from L3 cylinder cut-off running to V4 cylinder cut-off running, and FIG. 12 is a time chart for explaining the operation during a transition from V6 all-cylinder running to V4 cylinder cut-off running.

DESCRIPTION OF PREFERRED EMBODIMENTS

A first embodiment of the present invention is explained below by reference to FIG. 1 to FIG. 9.

Figure 2:
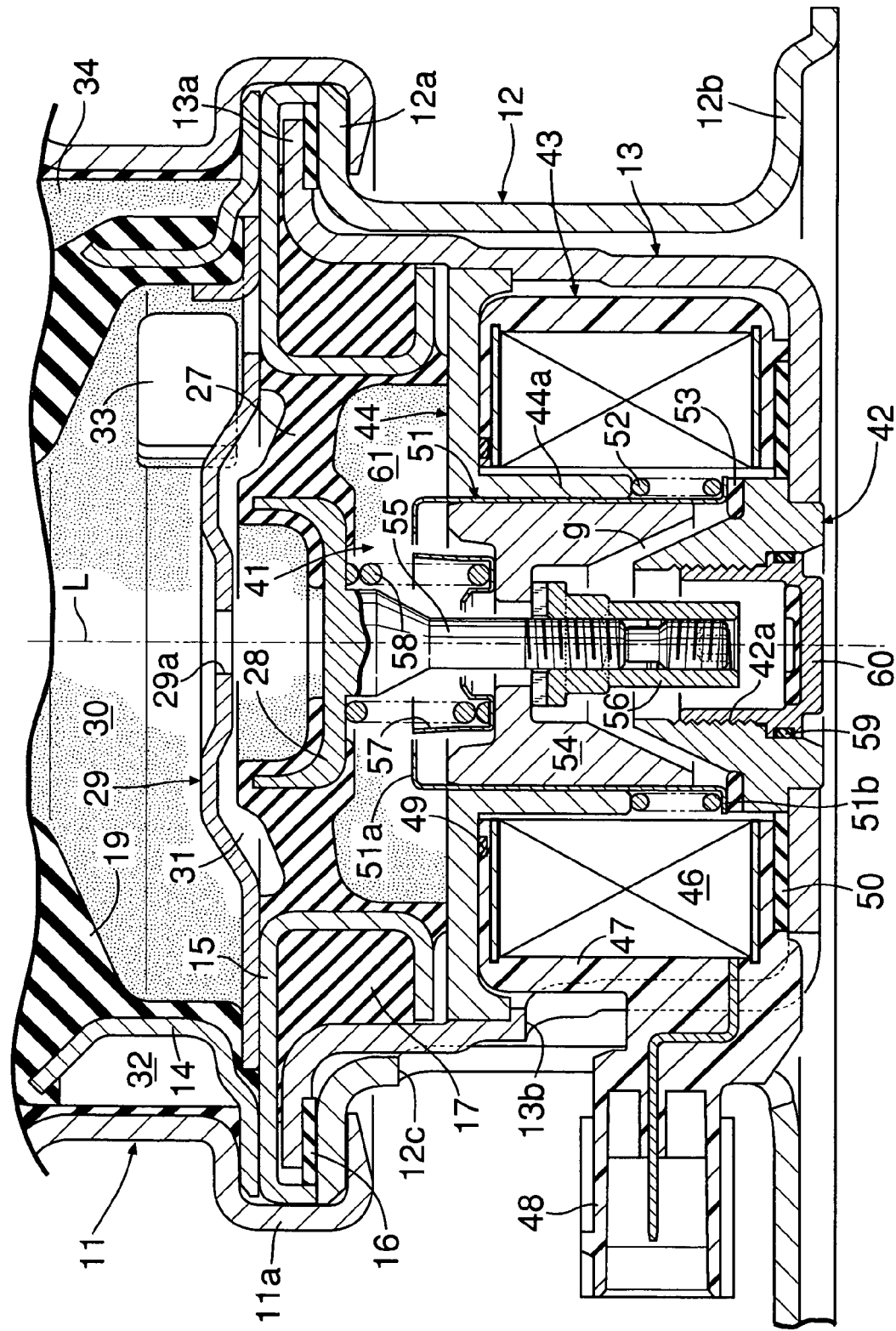

Referring to FIG. 1 and FIG. 2, an active vibration isolation support system M (active control mount) for elastically supporting an automobile engine in a vehicle body frame has a structure that is substantially symmetrical with respect to an axis L, in which, between a flange portion 11a at the lower end of a substantially cylindrical upper housing 11 and a flange portion 12a at the upper end of a substantially cylindrical lower housing 12, a flange portion 13a on the outer periphery of an upwardly opening substantially cup-shaped actuator case 13, an outer peripheral portion of an annular first elastic body support ring 14, and an outer peripheral portion of an annular second elastic body support ring 15 are superimposed and joined by crimping. In this process, an annular first floating rubber 16 is disposed between the flange portion 12a of the lower housing 12 and the flange portion 13a of the actuator case 13, and an annular second floating rubber 17 is disposed between an upper part of the actuator case 13 and an inner face of the second elastic body support ring 15, so that the actuator case 13 is floatingly supported such that it can move relative to the upper housing 11 and the lower housing 12.

Joined by vulcanization bonding to the first elastic body support ring 14 and a first elastic body support boss 18 disposed on the axis L, are the lower end and the upper end of a first elastic body 19 made of a thick rubber. A diaphragm support boss 20 is fixed to an upper face of the first elastic body support boss 18 by a bolt 21. An outer peripheral portion of a diaphragm 22 whose inner peripheral portion is joined by vulcanization bonding to the diaphragm support boss 20, is joined by vulcanization bonding to the upper housing 11. An engine mounting portion 20a integrally formed with an upper face of the diaphragm support boss 20 is fixed to the engine. A vehicle body mounting portion 12b at the lower end of the lower housing 12 is fixed to the vehicle body frame.

A flange portion 23a at the lower end of a stopper member 23 is joined by bolts 24 and nuts 25 to a flange portion 11b at the upper end of the upper housing 11. The engine mounting portion 20a projectingly provided on the upper face of the diaphragm support boss 20 faces a stopper rubber 26 attached to an upper inner face of the stopper member 23 so that the engine mounting portion 20a can abut against the stopper rubber 26. When a large load is input to the active vibration isolation support system M, the engine mounting portion 20a abuts against the stopper rubber 26, thereby suppressing excessive displacement of the engine.

An outer peripheral portion of a second elastic body 27 made of a membranous rubber is joined by vulcanization bonding to the second elastic body support ring 15. A movable member 28 is embedded in and joined by vulcanization bonding to a central portion of the second elastic body 27. A disc-shaped partition member 29 is fixed between an upper face of the second elastic body support ring 15 and the outer peripheral portion of the first elastic body 19. A first liquid chamber 30 defined by the partition member 29 and the first elastic body 19, and a second liquid chamber 31 defined by the partition member 29 and the second elastic body 27, communicate with each other via a through hole 29a formed in the middle of the partition member 29.

An annular through passage 32 is formed between the first elastic body support ring 14 and the upper housing 11. One end of the through passage 32 communicates with the first liquid chamber 30 via a through hole 33, and the other end of the through passage 32 communicates via a through hole 34 with a third liquid chamber 35 defined by the first elastic body 19 and the diaphragm 22.

The structure of an actuator 41 for driving the movable member 28 is now described.

Mounted within the actuator case 13 in sequence from the bottom to the top are a stationary core 42, a coil assembly 43, and a yoke 44. The coil assembly 43 is formed from a bobbin 45 disposed on the outer periphery of the stationary core 42, a cylindrical coil 46 wound around the bobbin 45, and a coil cover 47 covering the outer periphery of the coil 46. The coil cover 47 is formed integrally with a connector 48 running through openings 13b and 12c formed in the actuator case 13 and the lower housing 12 and extending outward.

A seal 49 is disposed between an upper face of the coil cover 47 and a lower face of the yoke 44. A seal 50 is disposed between a lower face of the coil cover 47 and an upper face of the actuator case 13. These seals 49 and 50 can prevent water or dust from entering an internal space 61 of the actuator 41 via the openings 13b and 12c formed in the actuator case 13 and the lower housing 12.

A thin cylindrical bearing member 51 is fitted, in a vertically slidable manner, into an inner peripheral face of a cylindrical portion 44a of the yoke 44. An upper flange 51a and a lower flange 51b are formed at the upper end and the lower end respectively of the bearing member 51, the upper flange 51a being bent radially inward, the lower flange 51b being bent radially outward. A set spring 52 is disposed in a compressed state between the lower flange 51b and the lower end of the cylindrical portion 44a of the yoke 44. The bearing member 51 is supported by the yoke 44 by the lower flange 51b being pressed against the upper face of the stationary core 42 via an elastic body 53 by means of the elastic force of the set spring 52.

A substantially cylindrical movable core 54 is fitted, in a vertically slidable manner, into an inner peripheral face of the bearing member 51. A rod 55 extending downward from the center of the movable member 28 runs loosely through the center of the movable core 54, and a nut 56 is tightened around the lower end of the rod 55. A set spring 58 is disposed in a compressed state between a spring seat 57 provided on an upper face of the movable core 54 and a lower face of the movable member 28. The movable core 54 is fixed by being pressed against the nut 56 by means of the elastic force of the set spring 58. In this state, the lower face of the movable core 54 and the upper face of the stationary core 44 face each other across a conical air gap g. The rod 55 and the nut 56 are loosely fitted into an opening 42a formed in the center of the stationary core 42, and this opening 42a is blocked by a plug 60 via a seal 59.

A crank pulse sensor Sa for detecting a crank pulse output accompanying rotation of a crankshaft of the engine and a TDC pulse sensor Sb for detecting a TDC pulse of each cylinder are connected to an electronic control unit U, which controls the supply of current to the actuator 41 of the active vibration isolation support system M. The crank pulse of the engine is output 24 times per revolution of the crankshaft, that is, once every 15° of crank angle.

Figure 3:
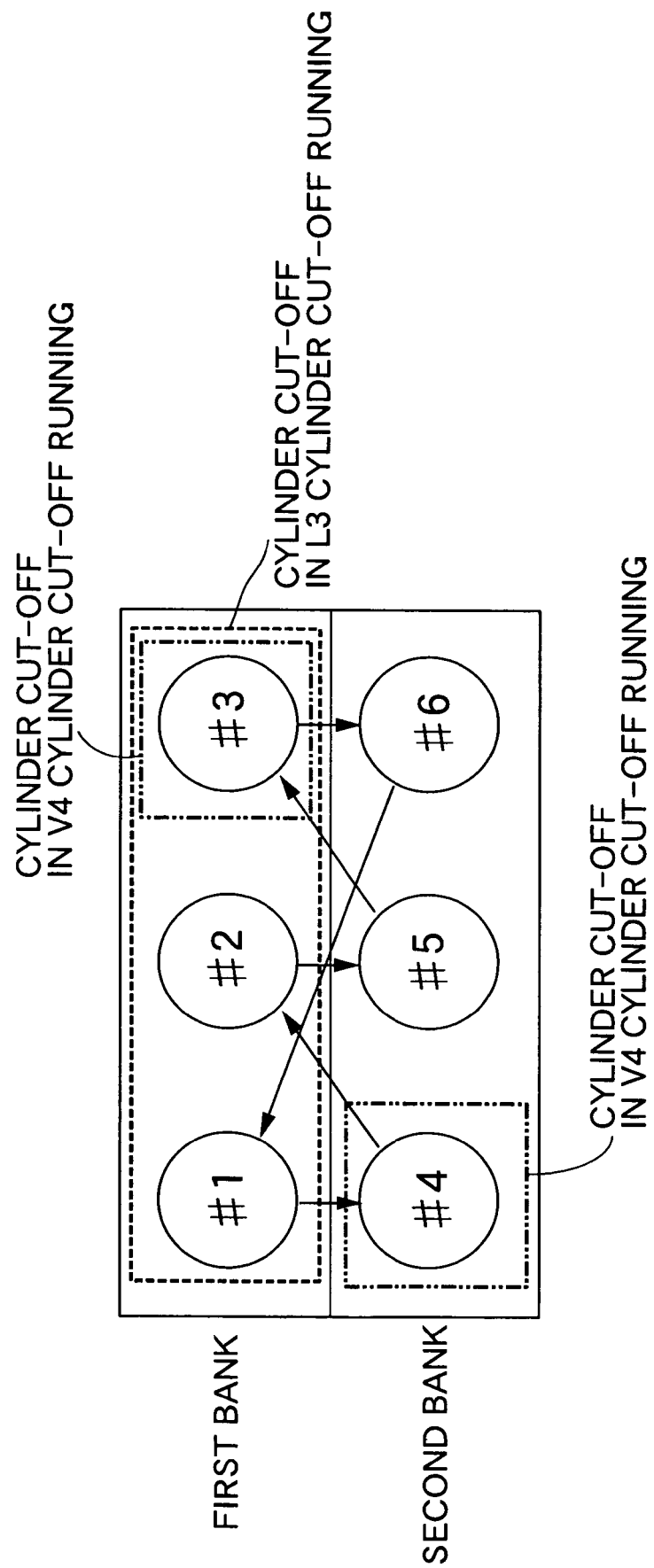

As shown in FIG. 3, the engine is a V6 engine; #1 cylinder, #2 cylinder and #3 cylinder are disposed in a first bank, and #4 cylinder, #5 cylinder and #6 cylinder are disposed in a second bank. The engine can switch, according to the load state of the engine, between all-cylinder running in which #1 cylinder to #6 cylinder are combusted in the order of #1→#4→#2→#5→#3→#6 (hereinafter, called V6 all-cylinder running), cylinder cut-off running in which #1 cylinder, #2 cylinder and #3 cylinder of the first bank are cut off (hereinafter, called L3 cylinder cut-off running), and cylinder cut-off running in which #3 cylinder of the first bank and #4 cylinder of the second bank are cut off (hereinafter, called V4 cylinder cut-off running). The combustion order of L3 cylinder cut-off running is #1→#2→#3, and the combustion order of V4 cylinder cut-off running is #1→#4 (cut off)→#2→#5→#3 (cut off)→#6.

In V6 all-cylinder running, since #1 cylinder to #6 cylinder are respectively combusted once at equal intervals while the crankshaft rotates twice, the engine vibrational state is $3^{rd}$ order vibration (three cycles of vibration in one revolution of the crankshaft), and thus one cycle of the vibration is 120°.

In L3 cylinder cut-off running, since #4 cylinder, #5 cylinder, and #6 cylinder of the second bank are respectively combusted once at equal intervals while the crankshaft rotates twice, the engine vibrational state is $1.5^{th}$ order vibration (1.5 cycles of vibration in one revolution of the crankshaft), and thus one cycle of the vibration is 240°.

In V4 cylinder cut-off running, since one cycle of vibration is formed by the combination of one cylinder cut-off period having a crank angle of 120° and two combustion periods having a crank angle of 120°, the engine vibrational state is $1^{st}$ order vibration (one cycle of vibration in one revolution of the crankshaft), and thus one cycle of the vibration is 360°.

Figure 4:
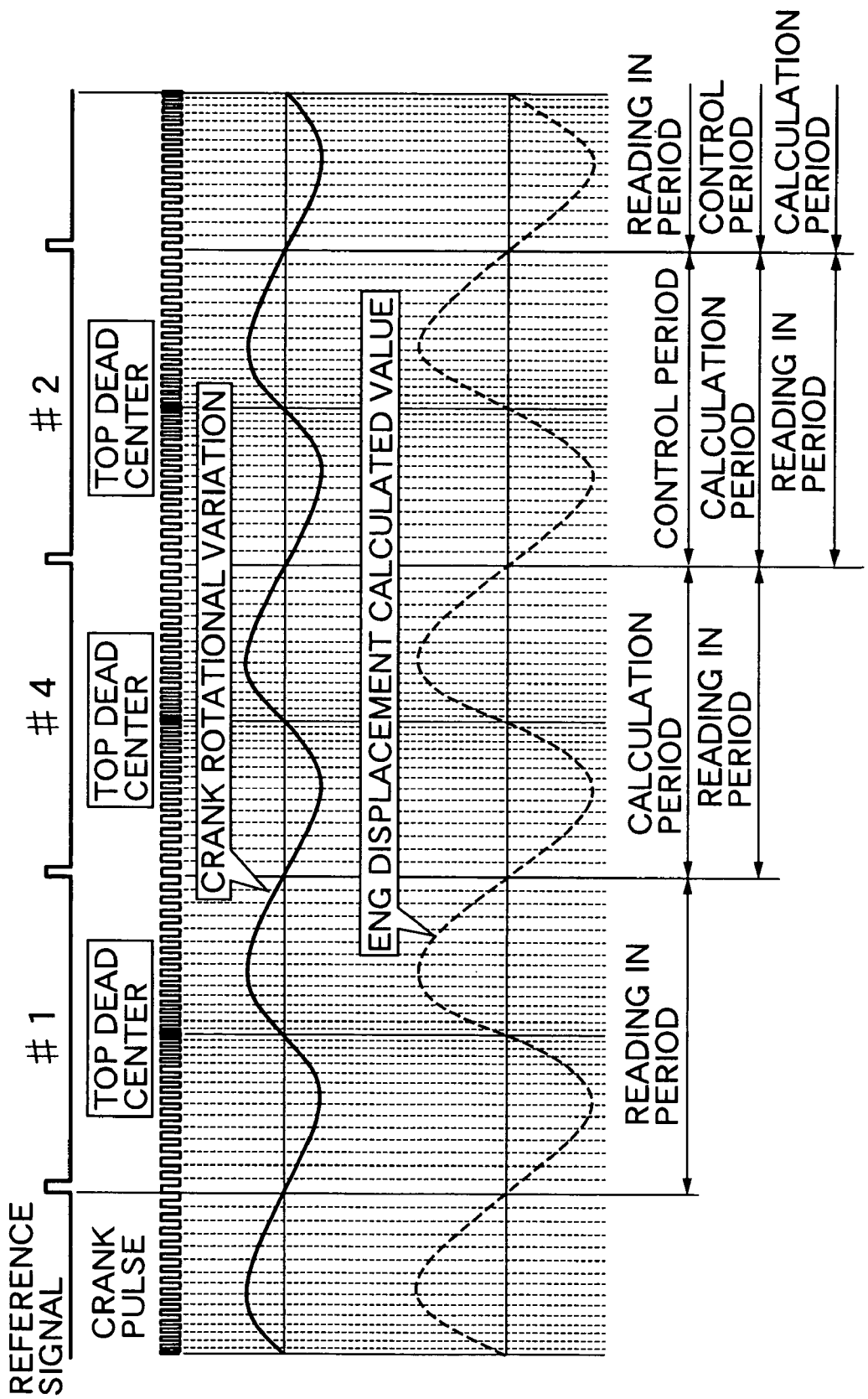

As shown in FIG. 4, control of the active vibration isolation support system M involves reading in a vibrational state of the engine in one particular cycle (read-in period), calculating a control current for the actuator 41 of the active vibration isolation support system M in the following one cycle (calculation period), and outputting the control current in the further following one cycle (control period), thereby operating the actuator 41 of the active vibration isolation support system M. Therefore, the operation of the active vibration isolation support system M in the current cycle is therefore controlled based on the vibrational state of the cycle before last.

The operation of the active vibration isolation support system M having the above-mentioned arrangement is now described.

When low frequency engine shake vibration occurs while the automobile is traveling, the first elastic body 19 is deformed by a load input from the engine via the diaphragm support boss 20 and the first elastic body support boss 18, thus changing the capacity of the first liquid chamber 30, so that a liquid moves to and fro between the first liquid chamber 30 and the third liquid chamber 35 via the through passage 32. When the capacity of the first liquid chamber 30 increases/decreases, the capacity of the third liquid chamber 35 decreases/increases correspondingly, and this change in the capacity of the third liquid chamber 35 is absorbed by elastic deformation of the diaphragm 22. The shape and the dimensions of the through passage 32 and the spring constant of the first elastic body 19 are set so that a low spring constant and high attenuation force are exhibited in the frequency region of the engine shake vibration. Therefore, it is possible to effectively suppress the vibration transmitted from the engine to the vehicle body frame.

In the frequency region of the engine shake vibration, the actuator 41 is maintained in a non-operating state.

When there is vibration having a higher frequency than that of the above-mentioned engine shake vibration, that is, vibration during idling or vibration during cylinder cut-off due to rotation of the engine crankshaft, the liquid within the through passage 32 providing communication between the first liquid chamber 30 and the third liquid chamber 35 becomes stationary and a vibration isolation function cannot be exhibited; the actuator 41 is therefore driven to exhibit a vibration isolation function.

In order to operate the actuator 41 of the active vibration isolation support system M to exhibit the vibration isolation function, the electronic control unit U controls the supply of current to the coil 46 based on signals from the crank pulse sensor Sa and the TDC pulse sensor Sb.

The control of the active vibration isolation support system M is now specifically described.

Figure 5:
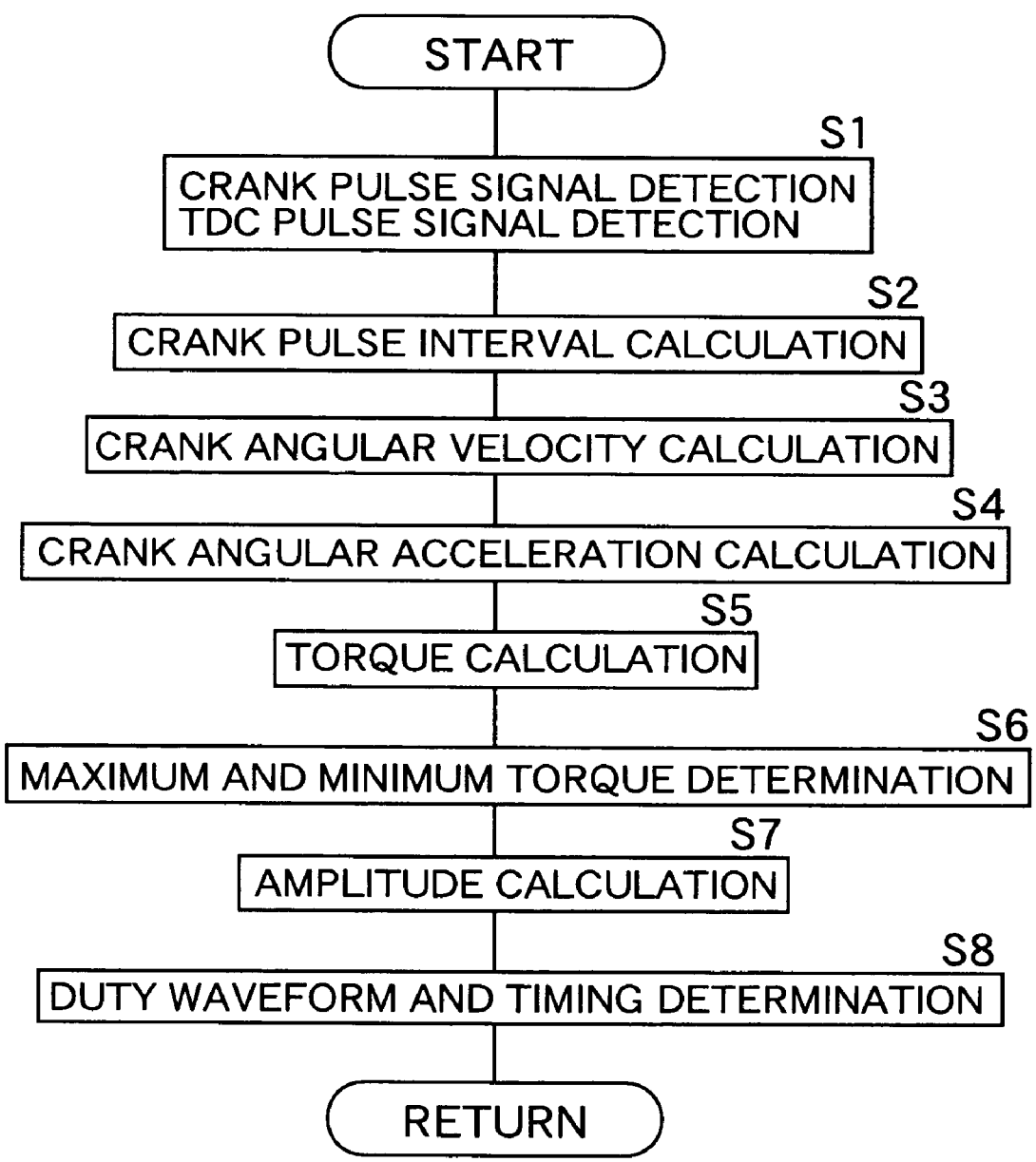

In the flow chart of FIG. 5, firstly in step S1, crank pulses output from the crank pulse sensor Sa every 15° of crank angle, and crank pulses output from the TDC pulse sensor Sb every 120° of crank angle are read in. In step S2, the crank pulses thus read in are compared with a reference TDC pulse so as to calculate a time interval between the crank pulses. In step S3, a crank angular velocity ω is calculated by dividing the 15° crank angle by the time interval between the crank pulses. In step S4, a crank angular acceleration dω/dt is calculated by differentiating the crank angular velocity ω with respect to time. In step S5, a torque Tq around the engine crankshaft 62 is calculated from Tq=I×dω/dt, where I is the moment of inertia around the engine crankshaft 62. This torque Tq becomes 0 if it is assumed that the crankshaft rotates at a constant angular velocity ω, but in an expansion stroke the angular velocity ω increases by acceleration of a piston, and in a compression stroke the angular velocity ω decreases by deceleration of the piston, thus generating a crank angular acceleration dω/dt; as a result a torque Tq that is proportional to the crank angular acceleration dω/dt is generated.

In step S6, a maximum value and a minimum value of two successive torque values are determined. In step S7, amplitude at the position of the active vibration isolation support system M supporting the engine is calculated as the difference between the maximum value and the minimum value of the torque, that is, a torque variation. In step S8, a duty waveform of current applied to the coil 46 of the actuator 41 are determined, and a duty output timing of the current is determined by comparing the bottom position of the amplitude with the TDC pulse.

As a result, the active vibration isolation support system M exerts the vibration isolation function as follows.

When the engine moves downward relative to the vehicle body frame and the first elastic body 19 is deformed downwardly thereby decreasing the capacity of the first liquid chamber 30, energizing the coil 46 of the actuator 41 with matching timing allows the movable core 54 to move downward toward the stationary core 42 by means of the attractive force generated in the air gap g, and the second elastic body 27 is deformed downwardly by being drawn by the movable member 28 connected to the movable core 54 via the rod 55. As a result, the capacity of the second liquid chamber 31 increases, so that the liquid in the first liquid chamber 30 which is compressed by the load from the engine, passes through the through hole 29a of the partition member 29 and flows into the second liquid chamber 31, thereby reducing the load transmitted from the engine to the vehicle body frame.

Subsequently, when the engine moves upward relative to the vehicle body frame and the first elastic body 19 is deformed upwardly thereby increasing the capacity of the first liquid chamber 30, de-energizing the coil 46 of the actuator 41 with matching timing allows the attractive force generated in the air gap g to disappear and the movable core 54 to move freely, so that the second elastic body 27 that has been deformed downwardly recovers upwardly by its own elastic recovery force. As a result, the capacity of the second liquid chamber 31 decreases, and the liquid in the second liquid chamber 31 passes through the through hole 29a of the partition member 29 and flows into the first liquid chamber 30, thereby allowing the engine to move upward relative to the vehicle body frame.

Figure 6:
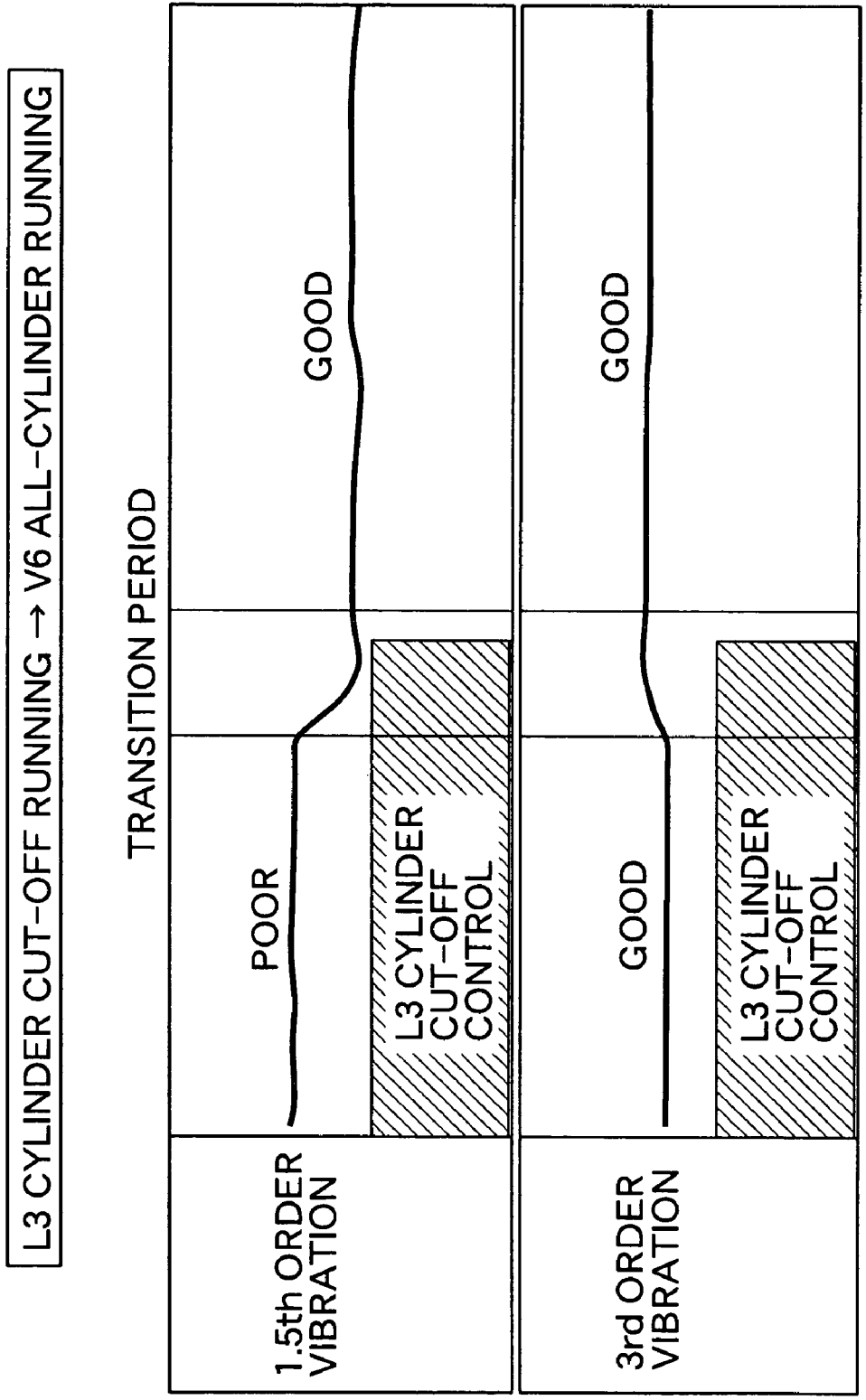

When switching over from L3 cylinder cut-off running to V6 all-cylinder running, as shown in FIG. 6, in L3 cylinder cut-off running prior to switching over, $1.5^{th}$ order vibration, which is the principle order of vibration thereof, occurs, but $3^{rd}$ order vibration, which is the principle order of vibration of V6 all-cylinder running, does not occur. On the other hand, in V6 all-cylinder running after switching over, $3^{rd}$ order vibration, which is the principle order of vibration thereof, occurs. Since the $3^{rd}$ order vibration in V6 all-cylinder running is naturally small due to the large number of cylinders, this $3^{rd}$ order vibration is not particularly a concern. Furthermore, in V6 all-cylinder running after switching over, the $1.5^{th}$ order vibration, which is the principle order of vibration of L3 cylinder cut-off running, does not occur either.

In this way, when switching over from L3 cylinder cut-off running to V6 all-cylinder running, the vibration decreases as a result of switching over, leading to no particular problem.

Figure 7:
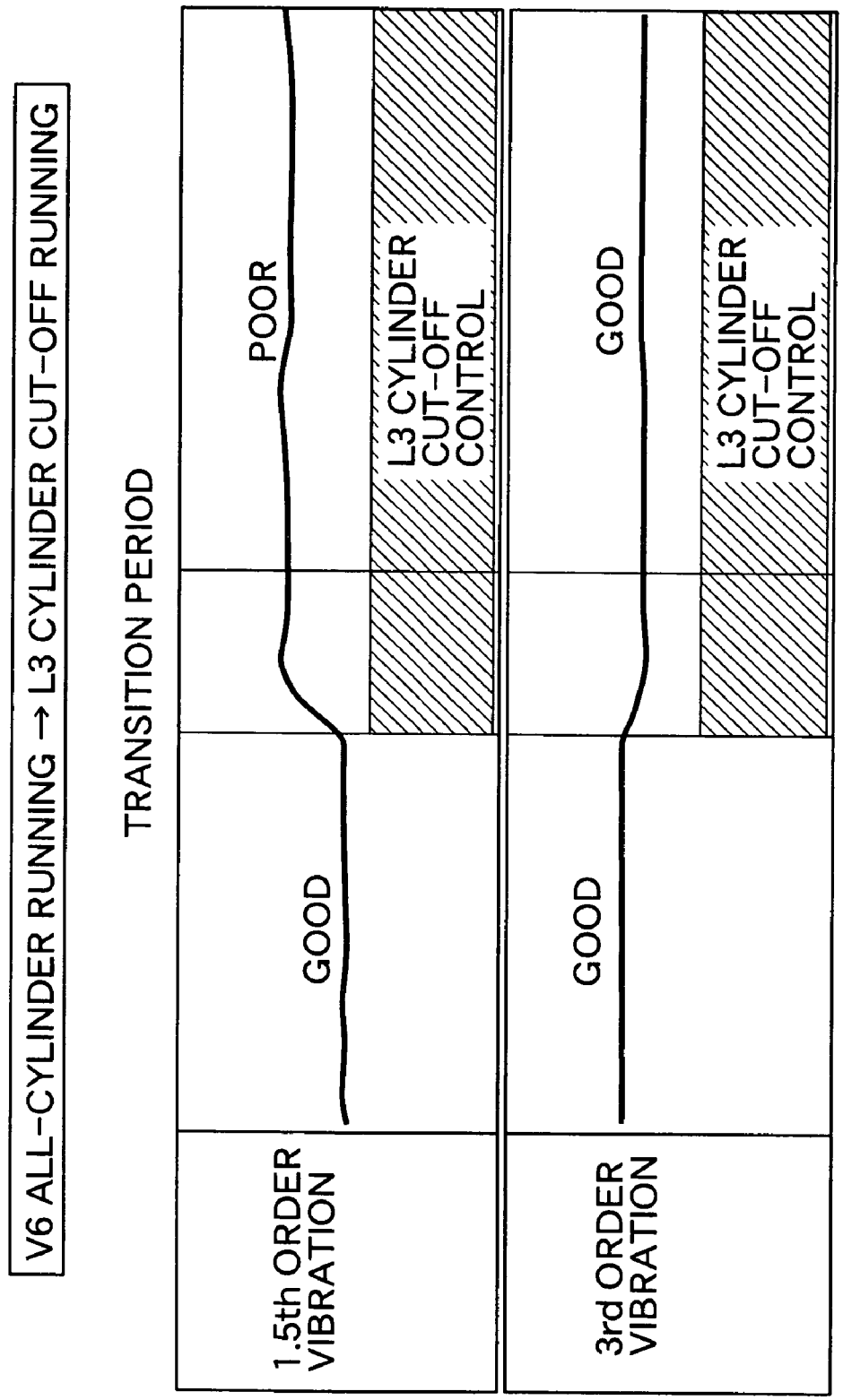

In contrast, when switching over from V6 all-cylinder running to L3 cylinder cut-off running, as shown in FIG. 7, in V6 all-cylinder running prior to switching over, $1.5^{th}$ order vibration, which is the principle order of vibration of L3 cylinder cut-off running, does not occur, but $3^{rd}$ order vibration, which is the principle order of vibration of V6 all-cylinder running, occurs, and as described above this $3^{rd}$ order vibration is not particularly a concern. On the other hand, in L3 cylinder cut-off running after switching over, $1.5^{th}$ order vibration, which is the principle order of vibration thereof, occurs, and $3^{rd}$ order vibration, which is the principle order of vibration of V6 all-cylinder running, does not occur.

In this way, since the ratio of '3' which is the order of vibration of V6 all-cylinder running prior to switching over, to 1.5° which is the order of vibration of L3 cylinder cut-off running after switching over, is the integer 2, the waveform of vibration occurring during a transitional period from V6 all-cylinder running to L3 cylinder cut-off running is relatively simple, and it is therefore easy to control the active vibration isolation support system M for suppressing vibration in the transitional period.

However, in switching between L3 cylinder cut-off running and V4 cylinder cut-off running, there are more complicated problems.

Figure 8:
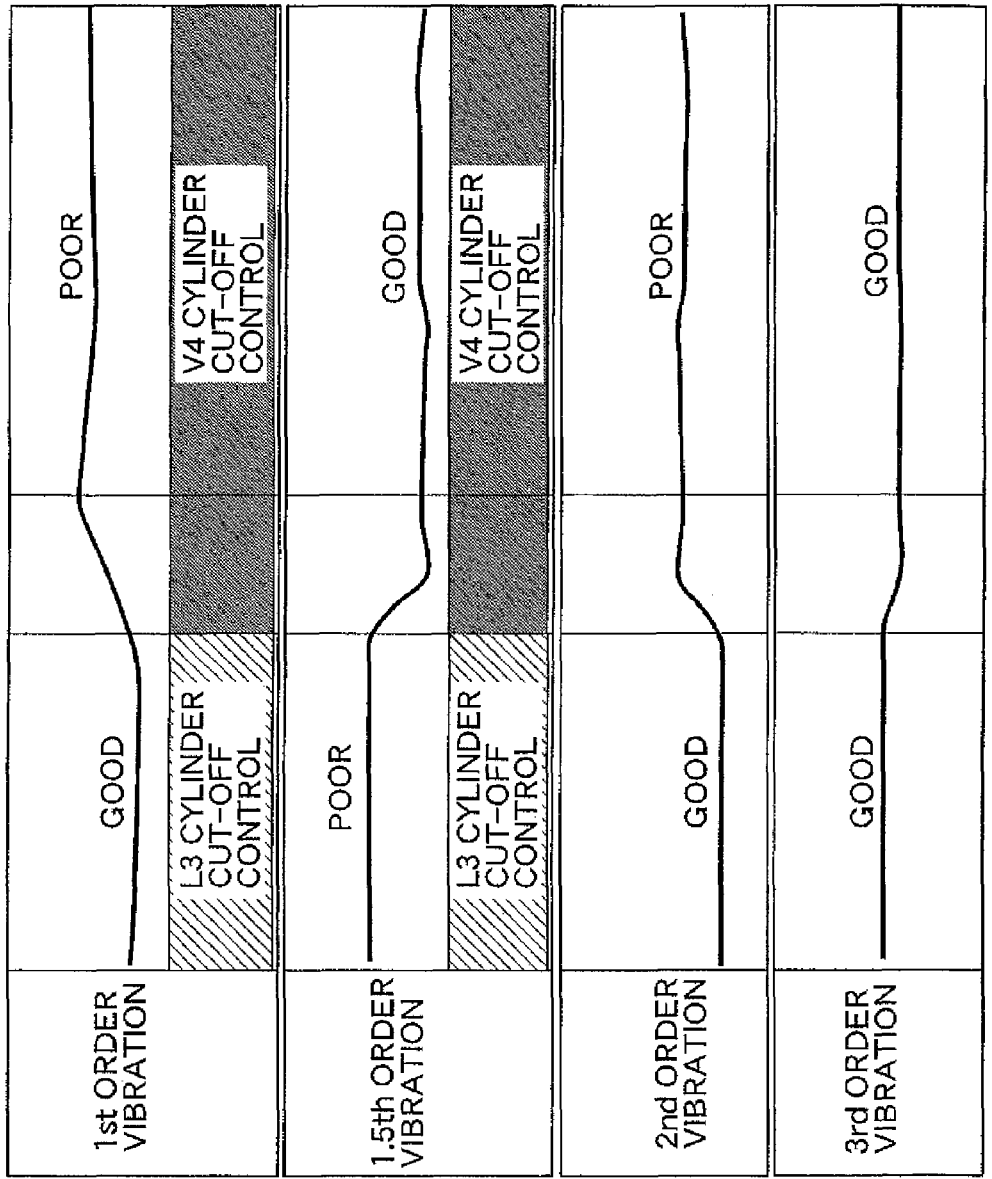

As shown in FIG. 8, for example, when switching over from L3 cylinder cut-off running to V4 cylinder cut-off running, $1^{st}$ order vibration, which is the principle order of vibration of V4 cylinder cut-off running, causes a problem. Since this $1^{st}$ order vibration is large, $2^{nd}$ order vibration, which is twice the order of the $1^{st}$ order vibration, also causes a problem.

In L3 cylinder cut-off running prior to switching over, $1.5^{th}$ order vibration, which is the principle order of vibration thereof, is large, and in V4 cylinder cut-off running after switching over $1^{st}$ order vibration, which is the principle order of vibration thereof, and $2^{nd}$ order vibration, which is twice the order of the $1^{st}$ order vibration, become large. The ratio of '1.5' which is the order of vibration of L3 cylinder cut-off running, and '1' (or '2') which is the order of vibration of V4 cylinder cut-off running, is 1.5 (or 0.75) and is not an integer. Therefore, during a transitional period from L3 cylinder cut-off running to V4 cylinder cut-off running, the $1^{st}$ order vibration, the $1.5^{th}$ order vibration, and the $2^{nd}$ order vibration are superimposed on each other to provide vibration having a complicated waveform, and it is very difficult to cancel this vibration by control of the active vibration isolation support system M.

Figure 9:
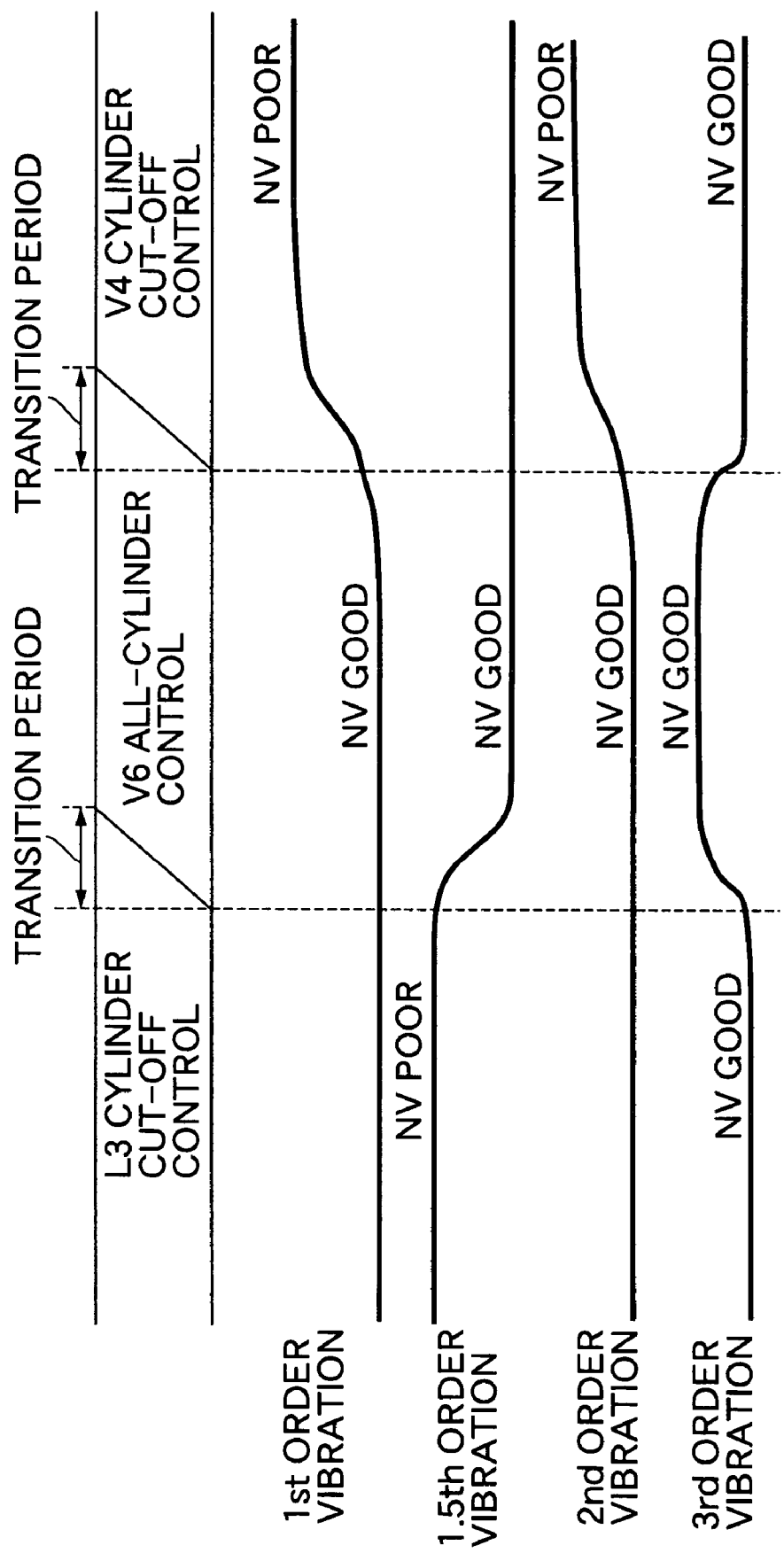

In this embodiment, as shown in FIG. 9, a predetermined period of V6 all-cylinder running is interposed between the L3 cylinder cut-off running and the V4 cylinder cut-off running. Interposing the V6 all-cylinder running in this way allows the transitional period to be divided into two, that is, a first half between L3 cylinder cut-off running and V6 all-cylinder running and a second half between V6 all-cylinder running and V4 cylinder cut-off running. Since all the $1^{st}$ order vibration, the $1.5^{th}$ order vibration, the $2^{nd}$ order vibration and the $3^{rd}$ order vibration are small during V6 all-cylinder running, when switching over from L3 cylinder cut-off running to V6 all-cylinder running in the first half, the $1.5^{th}$ order vibration that has been occurring until then disappears to thereby improve the overall vibrational state, leading to no problem with the control of the active vibration isolation support system M. When switching over from V6 all-cylinder running to V4 cylinder cut-off running in the second half, $1^{st}$ order vibration and $2^{nd}$ order vibration, which have not yet occurred, occur for the first time, but since the $2^{nd}$ order vibration is twice the order of vibration of the $1^{st}$ order vibration, the vibration waveform resulting from superimposition thereof is simple, and it is easy to suppress transmission of the $1^{st}$ order vibration and the $2^{nd}$ order vibration by controlling the active vibration isolation support system M.

It is necessary for the period of V6 all-cylinder running to be at least ½ a cycle (crank angle 360°), preferably to be one cycle (crank angle 720°) or more. In this embodiment, the period of V6 all-cylinder running is set to be constant at one cycle regardless of the magnitude of the load of the engine, thereby simplifying the control as compared with a case where the period of V6 all-cylinder running is an odd duration.

Furthermore, the control of interposing V6 all-cylinder running between L3 cylinder cut-off running and V4 cylinder cut-off running is carried out only when engine vibration is large, that is, when the engine load is high (e.g. an intake negative pressure of −200 mmHg or more), and V6 all-cylinder running is not interposed, that is, L3 cylinder cut-off running is directly shifted to V4 cylinder cut-off running, when the engine load is low and the vibration is therefore small.

A second embodiment of the present invention is now explained by reference to FIG. 10 to FIG. 12.

In V4 cylinder cut-off running, since one cycle of vibration is formed by the combination of one cylinder cut-off period having a crank angle of 120° and two combustion periods having a crank angle of 120°, the engine vibrational state is $1^{st}$ order vibration (one cycle of vibration in one revolution of the crankshaft), and thus one cycle of the vibration is 360°. Therefore, in V4 cylinder cut-off running, for setting one cycle, there are first to third patterns shown below. Here, 'comb.' means combustion, and 'cut' means cut-off.

First pattern: 'comb.'→'cut'→'comb.'
Second pattern: 'cut'→'comb.'→'comb.'
Third pattern: 'comb.'→'comb.'→'cut'

In V6 all-cylinder running and L3 cylinder cut-off running, the combustion intervals of the cylinders are equal to each other. Therefore, the timing to start a read-in period for reading in a vibrational state of the engine is made to coincide with the timing to start a combustion period for each of the cylinders.

Figure 10:
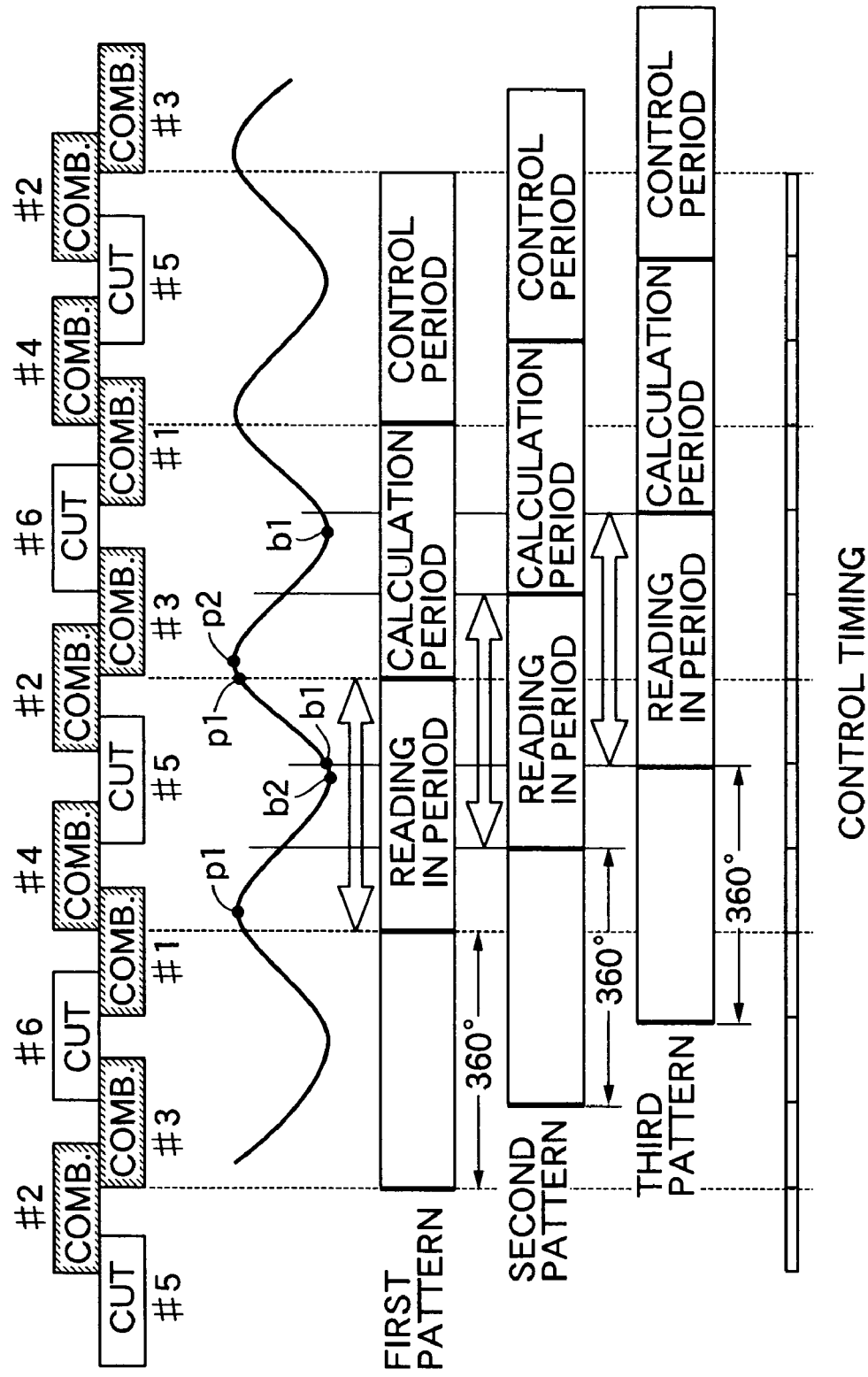
FIG. 10 to FIG. 12 show a second embodiment of the present invention.

On the other hand, as shown in FIG. 10, in V4 cylinder cut-off running, if the first pattern read-in period ('comb.'→'cut'→'comb.') is employed, since two peak values p1, p1 of the engine vibration waveform appear in the vicinity of the start and the end of the read-in period, it is impossible to determine which one is the true peak value, so that the vibrational state of the engine cannot be correctly detected. Similarly, if the third pattern read-in period ('comb.'→'comb.'→'cut') is employed, since two bottom values b1, b1 of the engine vibration waveform appear in the vicinity of the start and the end of the read-in period, it is impossible to determine which one is the true bottom value, so that the vibrational state of the engine cannot be correctly detected.

In contrast, if the second pattern read-in period ('cut'→'comb.'→'comb.') is employed, since one peak value p2 and one bottom value b2 of the engine vibration waveform appear in a middle section of the read-in period, it is possible to read out the true amplitude from the true peak value p1 and the true bottom value b2, thereby correctly detecting the engine vibrational state.

Figure 11:
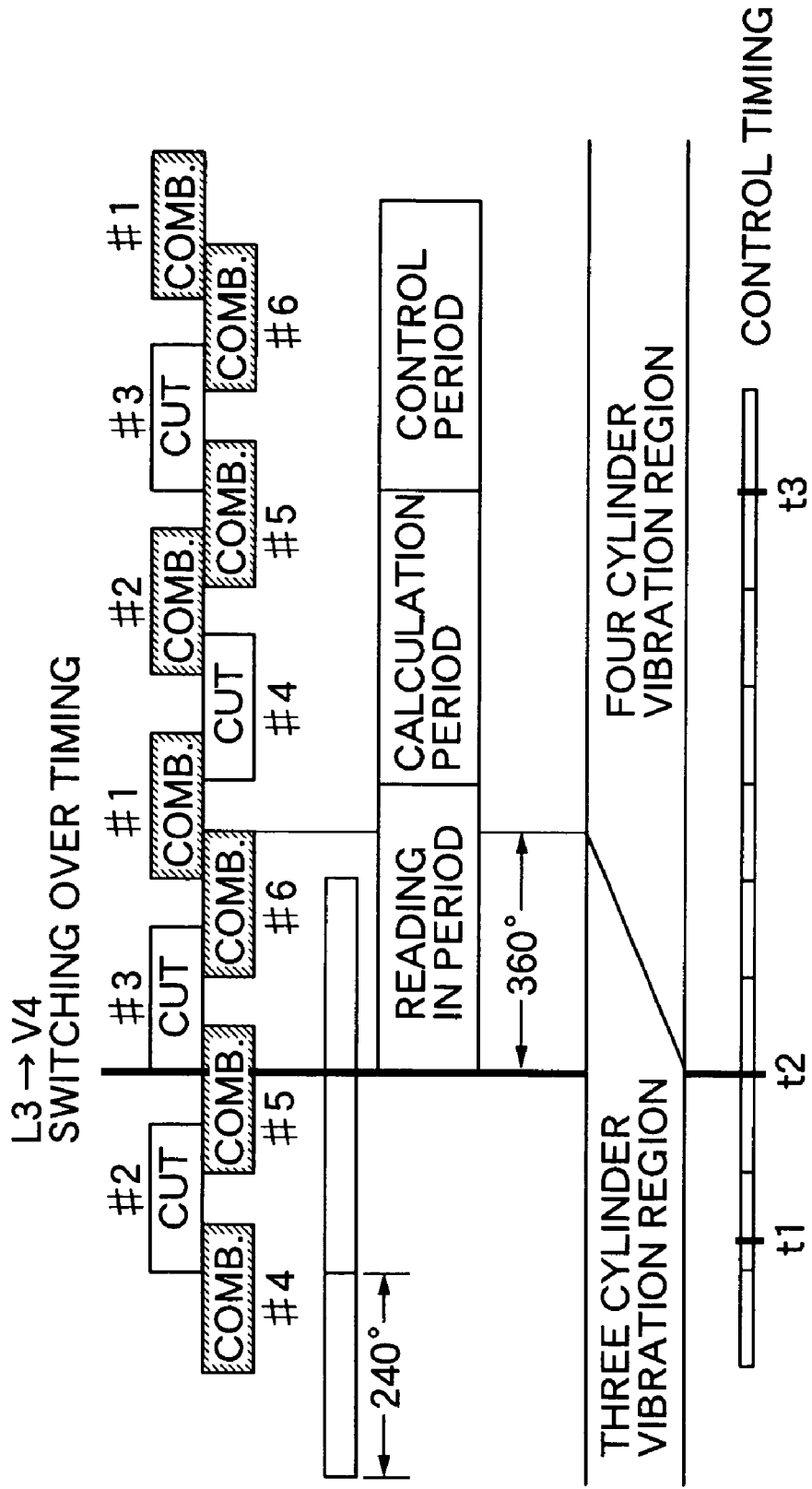

FIG. 11 shows control when switching over from L3 cylinder cut-off running to V4 cylinder cut-off running. When a signal to switch over from L3 cylinder cut-off running to V4 cylinder cut-off running is inputted at a position t1, a position t2 at the start of a cut-off period of #3 cylinder (or #4 cylinder), which period is the first one subsequent to the switch over signal being inputted, is employed as the start time for one cycle of V4 cylinder cut-off running. Thus, the read-in period of V4 cylinder cut-off running coincides with the read-in period of the second pattern ('cut'→'comb.'→'comb.'), and it is possible to read out the true peak value p1 and the true bottom value b1 of the engine vibration waveform, thereby precisely detecting the correct engine vibrational state.

During a period starting when the signal to switch over from L3 cylinder cut-off running to V4 cylinder cut-off running is inputted at the t1 position, going through the read-in period and the calculation period of the V4 cylinder cut-off running, and finishing when control for V4 cylinder cut-off running is actually started in a control period (t3 position), control of the active vibration isolation support system M for the transient period from L3 cylinder cut-off running to V4 cylinder cut-off running is carried out. This control for the transient period can employ any technique.

Figure 12:
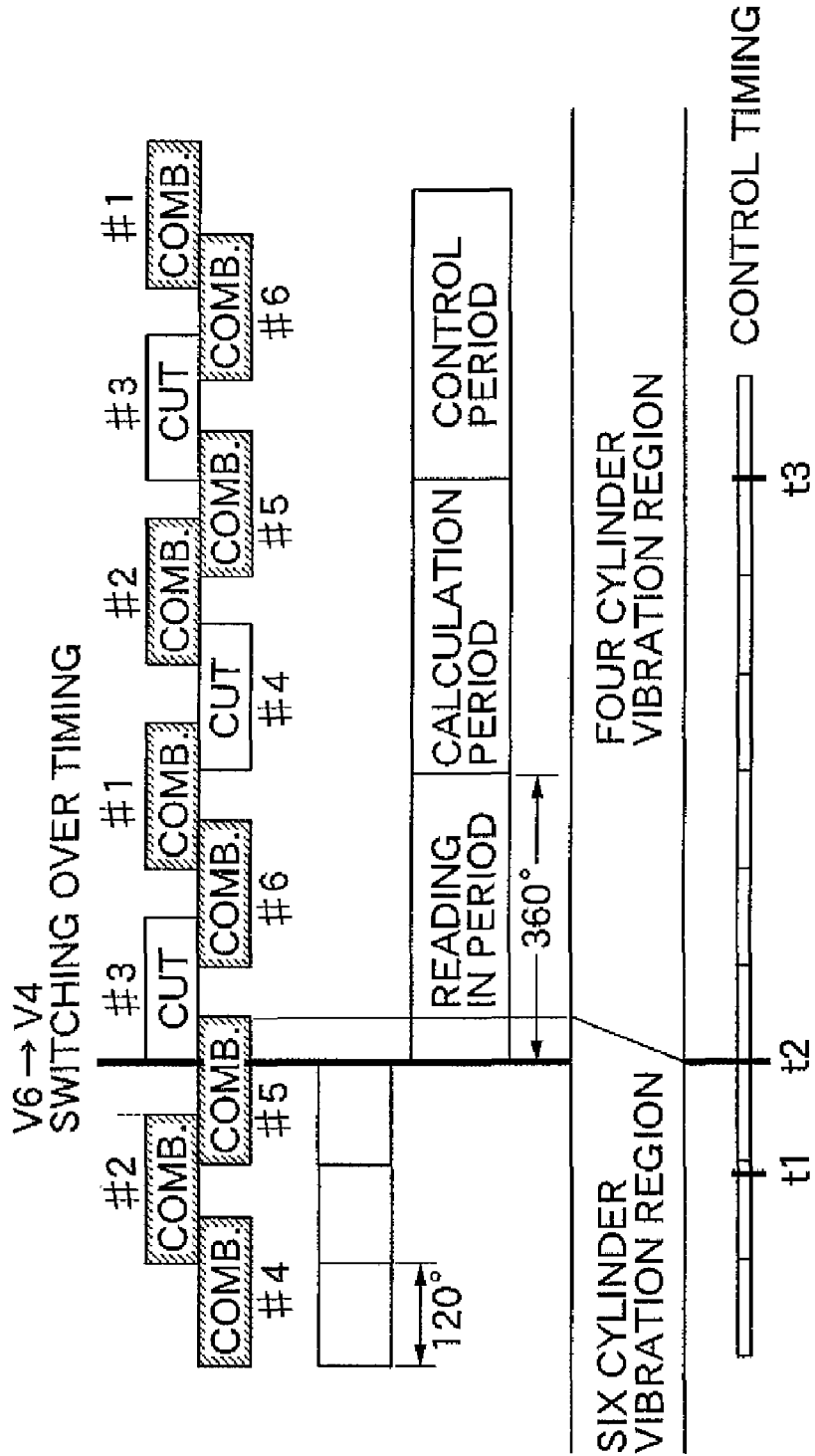

FIG. 12 shows control when switching over from V6 all-cylinder running to V4 cylinder cut-off running. When a signal to switch over from V6 all-cylinder running to V4 cylinder cut-off running is inputted at a position t1, a position t2 at the start of a cut-off period of #3 cylinder (or #4 cylinder), which period is the first one subsequent to the switch over signal being inputted, is employed as the start time for one cycle of V4 cylinder cut-off running. Thus, the read-in period of V4 cylinder cut-off running coincides with the read-in period of the second pattern ('cut'→'comb.'→'comb.'), and it is possible to read out the true peak value p1 and the true bottom value b1 of the engine vibration waveform, thereby precisely detecting the correct engine vibrational state.

During a period starting when the signal to switch over from V6 all-cylinder running to V4 cylinder cut-off running is inputted at the t1 position, going through the read-in period and the calculation period of the V4 cylinder cut-off running, and finishing when control for V4 cylinder cut-off running is actually started in a control period (t3 position), control of the active vibration isolation support system M for the transient period from V6 all-cylinder running to V4 cylinder cut-off running is carried out. This control for the transient period can employ any technique.

Although the embodiments of the present invention have been described above, various modifications in design can be made thereto without deviating from the subject matter of the present invention.

For example, in the first embodiment, control of switching over from L3 cylinder cut-off running to V4 cylinder cut-off running is explained, but the present invention may is also applicable to control of switching over from V4 cylinder cut-off running to L3 cylinder cut-off running.

Furthermore, in the second embodiment, the #3 cylinder and the #4 cylinder are cut off during V4 cylinder cut-off running, but the cylinders to be cut off are not limited to the #3 cylinder and the #4 cylinder.

Moreover, in the second embodiment, the engine vibrational state may be calculated by a filter calculation of the crank angular velocity based on rotational variation of the crankshaft using a differential filter, thereby eliminating the influence of noise. In this case, a series of two combustion periods is started at the same time as when starting one cycle for reading in the engine vibrational state during cylinder cut-off running, and thereafter one cylinder cut-off period is carried out. This is because, since the engine vibrational state is calculated by filter calculation of the crank angular velocity based on the rotational variation of the crankshaft using the differential filter, the engine vibration waveform shifts forward by 90° due to the filter calculation using the differential filter. Also in this case, it is possible to reliably obtain a peak value and a bottom value of the vibrational state in one cycle, and accurately estimate the engine vibrational state, thereby improving the vibration isolation performance of the active vibration isolation support system.

What is claimed is:

1. An engine vibration isolation system comprising:
an active vibration isolation support system for supporting, on a vehicle body, an engine that can switch among an all-cylinder running, a first modified running and a second modified running, wherein said first modified running and said second modified running differ from one another in the number of cylinders that are cut off; and
a control portion for controlling an actuator of the active vibration isolation support system according to a vibrational state of the engine so as to suppress transmission of vibration from the engine to the vehicle body,
wherein, when a ratio of an order of vibration of the first modified running to an order of vibration of the second modified running is not an integer, the control portion interposes the all-cylinder running, in which all the cylinders are operated, in a transitional period between the first modified running and the second modified running.

2. The engine vibration isolation system according to claim 1, wherein a period of the all-cylinder running is constant regardless of magnitude of load of the engine.

3. The engine vibration isolation system according to claim 2, wherein a period of the all-cylinder running is one cycle.

4. An engine vibration isolation method comprising the steps of:
supporting, on a vehicle body via an active vibration isolation support system, an engine that can switch among an all-cylinder running, a first modified running and a second modified running, wherein said first modified running and said second modified running differ from one another in the number of cylinders that are cut off; and
controlling, via a control portion, an actuator of the active vibration isolation support system according to a vibrational state of the engine so as to suppress transmission of vibration from the engine to the vehicle body,
wherein the method further comprises the steps of:
carrying out the first modified running in a first period;
carrying out, in a transitional period subsequent to the first period, all-cylinder running in which all the cylinders are in operation; and
carrying out the second modified running in a second period subsequent to the transitional period; and
wherein when the ratio of the order of vibration of the first modified running and the order of vibration of the second modified running is not an integer, the control portion interposes the all-cylinder running.

5. A control system for an active vibration isolation support system which supports, on a vehicle body, an engine that carries out cylinder cut-off running which combines one cylinder cut-off period and two combustion periods in one cycle, the control system comprising a control portion for controlling an actuator of the active vibration isolation support system according to a vibrational state of the engine so as to suppress transmission of vibration from the engine to the vehicle body,
wherein the control portion sets start time of one cycle of reading in the engine vibrational state during the cylinder cut-off running so as to coincide with start time of the cylinder cut-off period.

6. A control method for an active vibration isolation support system, comprising the steps of:
supporting, on a vehicle body via the active vibration isolation support system, an engine that carries out cylinder cut-off running which combines one cylinder cut-off period and two combustion periods in one cycle; and
controlling, via a control portion, an actuator of the active vibration isolation support system according to a vibrational state of the engine so as to suppress transmission of vibration from the engine to the vehicle body,
wherein the one cylinder cut-off period starts at the same time as when starting one cycle of reading in the engine vibrational state during the cylinder cut-off running, and the two combustion periods follow.

7. A control system for an active vibration isolation support system which supports, on a vehicle body, an engine that carries out cylinder cut-off running which combines one cylinder cut-off period and two combustion periods in one cycle, the control system comprising a control portion for controlling an actuator of the active vibration isolation support system according to a vibrational state of the engine so as to suppress transmission of vibration from the engine to the vehicle body,
wherein the control portion calculates the engine vibrational state by filter calculation of a crank angular velocity based on rotational variation of a crankshaft using a differential filter, and sets start time of one cycle of reading in the engine vibrational state during the cylinder cut-off running so as to coincide with start time of the combustion period following the cylinder cut-off period.

8. A control method for an active vibration isolation support system, comprising the steps of:
supporting, on a vehicle body via the active vibration isolation support system, an engine that carries out cylinder cut-off running which combines one cylinder cut-off period and two combustion periods in one cycle; and controlling, via a control portion, an actuator of the active vibration isolation support system according to a vibrational state of the engine so as to suppress transmission of vibration from the engine to the vehicle body, wherein the engine vibrational state is calculated by filter calculation of a crank angular velocity based on rotational variation of a crankshaft using a differential filter, a series of the two combustion periods is started at the same time as when starting one cycle of reading in the engine vibrational state during the cylinder cut-off running, and the one cylinder cut-off period follows.

* * * * *